United States Patent [19]

Murase

[11] Patent Number: 4,559,954
[45] Date of Patent: Dec. 24, 1985

[54] ELECTRONIC CLINICAL THERMOMETER

[75] Inventor: Masakazu Murase, Fuji, Japan

[73] Assignee: Terumo Kabushiki Kaisha, Tokyo, Japan

[21] Appl. No.: 454,020

[22] Filed: Dec. 28, 1982

[30] Foreign Application Priority Data

Jan. 13, 1982 [JP] Japan ................................. 57-2808

[51] Int. Cl.⁴ .............................................. A61B 5/00
[52] U.S. Cl. .................................... 128/736; 374/107
[58] Field of Search ............... 128/736; 374/102–103, 374/107, 101

[56] References Cited

U.S. PATENT DOCUMENTS 3,273,395  9/1966  Schwarz ........................ 128/736 X
4,161,880  7/1979  Prosky ............................ 128/736 X

FOREIGN PATENT DOCUMENTS

2360011  1/1975  Fed. Rep. of Germany .
3030990  4/1981  Fed. Rep. of Germany .
7804089  9/1978  France .
0040572  4/1978  Japan .................................. 128/736
2010487A  6/1979  United Kingdom .
2085595A  4/1982  United Kingdom .

Primary Examiner—Lee S. Cohen
Assistant Examiner—Angela D. Sykes
Attorney, Agent, or Firm—Frishauf, Holtz, Goodman & Woodward

[57] ABSTRACT

An electronic clinical thermometer which uses a small quantity of corrective data for correcting a non-linear output into a linear output to produce a correct temperature reading, and which includes a temperature sensing unit, a corrective data storage unit and an adder. The correction is performed by using the output of the sensing unit to address the storage unit to obtain a read-out of corrective data, and by adding the corrective data to the data in the sensing unit output by means of the adder. The output of the sensing unit has a resolution, or accuracy, higher than a predetermined temperature resolution. To read the corrective data out of the storage unit, the later is addressed by higher order bits of the sensing unit output, these bits representing a resolution which corresponds to the predetermined temperature resolution.

12 Claims, 9 Drawing Figures

ELECTRONIC CLINICAL THERMOMETER

BACKGROUND OF THE INVENTION

1. Field of the Invention

This invention relates to an electronic clinical thermometer. More particularly, the invention relates to an electronic clinical thermometer equipped with a sensing unit which relies upon a temperature sensing element having a non-linear characteristic, wherein the magnitude of an output signal from the sensing unit is capable of being corrected to approximate a linear output value in a predetermined temperature range.

2. Description of the Prior Art

Temperature sensors presently available for practical use almost all have a temperature output characteristic which is non-linear. With tempeerature sensing elements of this kind, it is common practice to obtain a linearized output by using hardware techniques relying upon bridge circuits or the like. Recently, however, systems have been proposed wherein the correction into a linear output is achieved through application of software-based techniques.

In one proposed example, a deviation in the non-linear output value of a thermistor from a linear output value in a predetermined temperature range is corrected by relying upon correction means in which items of linear output data corresponding to each item of non-linear output data from the thermistor are stored beforehand, in the form of a table, in a ROM (read-only memory). In actually measuring temperature, non-linear output data arriving from the thermistor is applied to the correction means as an input signal, in response to which the correct corresponding linear output data is obtained from the ROM. A defect encountered with this system, however, is the requirement for a memory capable of storing a table of great size.

In another example of a proposed electronic clinical thermometer, items of data indicative of the non-linear characteristic are obtained in advance, and an arithmetic program for finding linear output values from the non-linear output values, by means of computations based on said data, is loaded into a microcomputer. In order to obtain linear output values, therefore, it is necessary for the microprocessor to perform complex and time-consuming processing. In other words, the user must wait for the processor to complete its processing operations before the results of measurement can be known.

SUMMARY OF THE INVENTION

The present invention has been devised in view of the disadvantages possessed by the conventional electronic clinical thermometer which uses a temperature sensing element or sensing circuit having a non-linear temperature and output characteristic, wherein a linear output is obtained through the application of software.

Accordingly, an object of the present invention is to provide an electronic clinical thermometer which does not require a memory of large capacity for storing a large table of corresponding data.

Another object of the present invention is to provide an electronic clinical thermometer in which corrected results are obtained after a very short processing time.

These and other objects of the present invention are attained by providing an electronic clinical thermometer having a temperature sensing unit for producing an output which corresponds to a sensed temperature, a corrective data storage unit in which plural items of corrective data are stored, the storage unit being addressed by an input signal which is the output of the temperature sensing unit, wherein corrective data corresponding to the address input is read out of the storage unit, and an arithmetic unit for performing an arithmetic operation on the corrective data read out of the corrective data storage unit and on the output of the temperature sensing unit, the output signal being made to approximate a linear output in a predetermined temperature range. The arithmetic unit comprises an adder for adding the output of the sensing unit and the corrective data.

The output produced by the sensing unit is a digital value having a resolution, or accuracy, greater than the required temperature resolution. In order to correct this digital value with a predetermined accuracy, higher order bits of the digital value that represent a resolution corresponding to a predetermined accuracy serve as the address for reading corrective data out of the storage unit.

The temperature sensing unit comprises a thermistor for sensing temperature, an RC oscillator circuit connected to the thermistor, and a counter for converting the oscillation frequency of the oscillator circuit into a digital value indicative of pulse number per unit time.

Other features and advantages of the invention will be apparent from the following description taken in conjunction with the accompanying drawings in which like reference characters designate the same or similar parts throughout the figures thereof.

DESCRIPTION OF THE PREFERRED EMBODIMENTS

Figure 1:
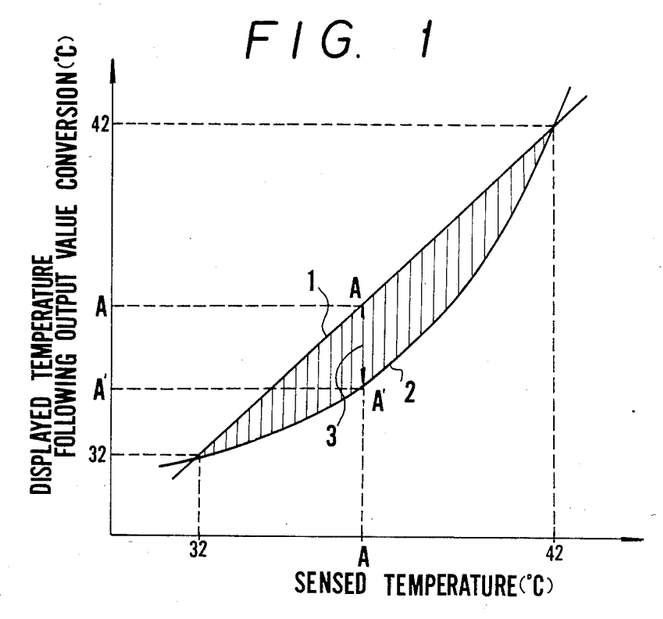
FIG. 1 is a graphical representation showing the relation between non-linear output values indicative of temperature measured by a thermistor, and linear output values.

Reference will first be had to the graphical representation of FIG. 1, showing linear and non-linear output characteristics, for describing the relation between a temperature sensed by a thermistor and displayed temperature obtained by applying a linear functional conversion to an output signal corresponding to the sensed temperature.

If the output characteristic of a thermistor were linear, then the characteristic would define a straight line of a constant slope, as indicated at 1 in FIG. 1. Since a thermistor actually has a non-linear output characteristic, however, the characteristic is as indicated at 2 between the temperatures of 32° C. and 42° C. Thus, the actually sensed temperature A appears as a temperature A′ because of the non-linear output characteristic, with the difference between the actually sensed temperature and the output of the thermistor, shown at 3, showing up as a difference in the displayed temperature. In other words, when the temperature is displayed on display means, the difference indicated at 3 in FIG. 1 corresponds to a correction factor which must be applied when linear output values are required.

Figure 2:
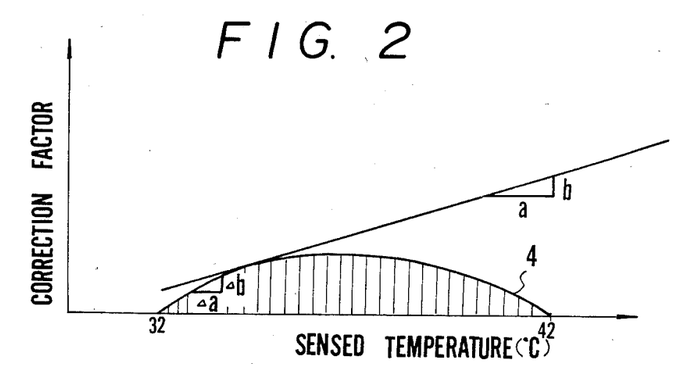
FIG. 2 is a graphical representation showing correction factors for a linear outut of temperature.

If we plot the aforementioned difference in output value as a correction factor along the vertical axis and plot the sensed temperature along the horizontal axis, then the result is the graph shown in FIG. 2. For practical purposes, an electronic clinical thermometer is required to have a resolution, or accuracy, of no less than 0.01° C. between temperatures of 32° C. and 42° C. This means that about ten bits are required to express temperature in terms of a binary number. Thus, a convenient expedient is to convert the non-linear output of a thermistor into a ten-bit digital value, and then correct this digitalized output into a value corresponding to a linear output.

A discussion will now be had as to the fundamental principle of the present invention.

In FIG. 2, the tangent to the correction curve 4 between 32° C. and 42° C. has a maximum slope expressed by b/a having a value of not more than about 0.1, the value differing slightly depending upon the circuit. Let us assume that a correction is to be applied to achieve an accuracy of within 0.01° C. Since $\Delta b$ in FIG. 2 is to have an accuracy of within 0.01° C., we make use of the expression $\Delta a = (a/b)\Delta b$, derived from $b/a = \Delta b/\Delta a$. Thus, since $b/a = 0.1$, as mentioned above, we have $\Delta a = (1/0.1) \times 0.01$, so that we obtain $\Delta a = 0.1°$ C. In other words, if a correction is applied at intervals of 0.1° C., then accuracy can be held within 0.01° C.

From the foregoing reasoning, the relation $b/a \approx 0.1 < \frac{1}{2}^3$ is obtained even if the three lower order bits of ten-bit uncorrected data are deleted. Therefore, a fully satisfactory correction is capable of being applied to achieve an accuracy of within 0.01° C. by making use of the seven remaining higher order bits.

Figure 3:
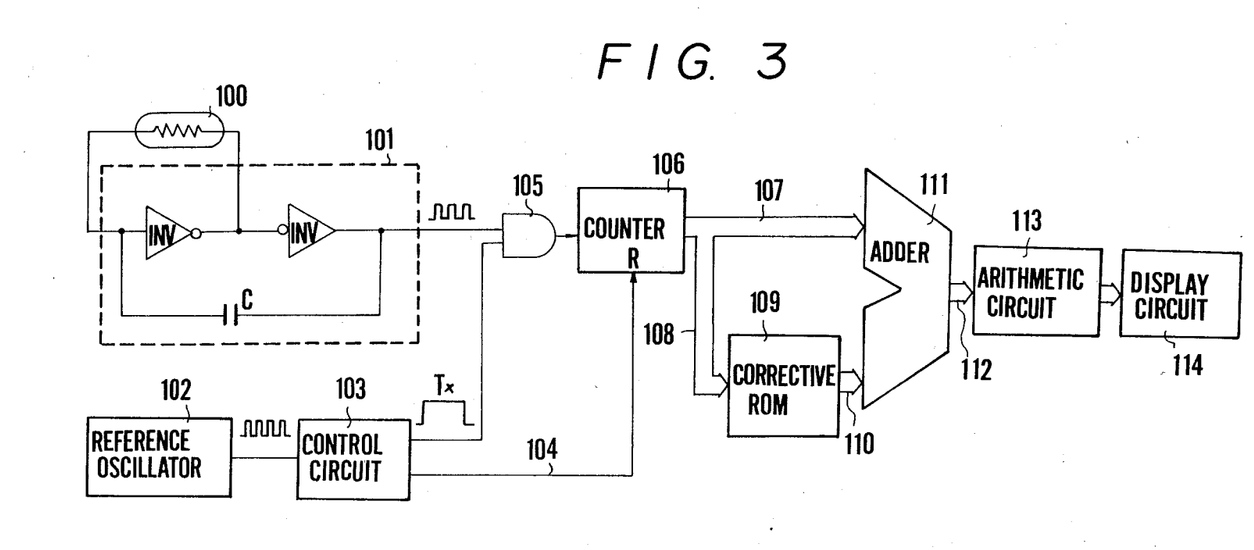
FIG. 3 is a block diagram illustrating an embodiment of an electronic clinical thermometer according to the present invention.

Shown in the block diagram of FIG. 3 is a basic arrangement of an electronic clinical thermometer embodying the present invention, which is based on the foregoing principle.

In FIG. 3, the circuit arrangement includes an astable multivibrator 101 comprising a capacitor C and two inverters INV. The oscillation frequency of the multivibrator 101, which is connected to a thermistor 100 serving as a temperature sensing element, is dependent upon the temperature-variable resistance value of the thermistor. A reference oscillator 102, which oscillates at a constant frequency, has its output connected to a control circuit 103 adapted to count the number of pulses in the oscillator output for producing a gating signal pulse of a predetermined duration $T_x$. Before beginning a counting operation, however, the control circuit 103 produces a counter reset pulse on its output line 104 to reset a counter 106. An AND gate 105, which receives the oscillation output pulse train from multivibrator 101, delivers these pulses to the counter 106 for a period of time corresponding to the duration of the gating pulse which arrives at the other input terminal of the AND gate from the control circuit 103. The counter 106 produces binary output data 107 which corresponds to the number of oscillation pulses obtained from the astable multivibrator 101 for the duration $T_x$. The binary output data 107 is applied to one input terminal of an adder 111. From the binary output data 107, a signal 108 consisting of the seven higher order bits is applied as an address to a corrective ROM 109 having a store of corrective data. In response to the seven-bit address, the ROM provides a corrective output 110 designated by the address. The adder 111 then proceeds to operate on (i.e., to add in this embodiment) the binary output data 107 from counter 106 and the corrective output 110 from ROM 109, thereby computing a corrected output 112 that is applied to an arithmetic circuit 113. The latter performs an arithmetic operation (based on a linear function in this embodiment) for obtaining a temperature value from the corrected output 112. The result of this operation is applied to a display circuit 114 for providing a display of temperature.

The number of bits necessary for storing the corrective data in the corrective ROM 109 should be enough to express the correction factor indicated at 3 in FIG. 1. If we express the magnitude of the correction factor 3 with an accuracy of 0.01° C. and assume the maximum correction factor to be 0.5° C., then 50 correction factors are required (obtained from the relation 0.5° C./0.01° C. = 50). Thus, each item of corrective data can be specified if six bits are available. In actual practice, variance is expected because no two thermistors are alike. Accordingly, accuracy can be improved further by finding the difference in linear output values from one thermistor to another and adopting a PROM (programmable read-only memory) as the ROM 109 to store the difference in linear output as the corrective values.

Figure 4:
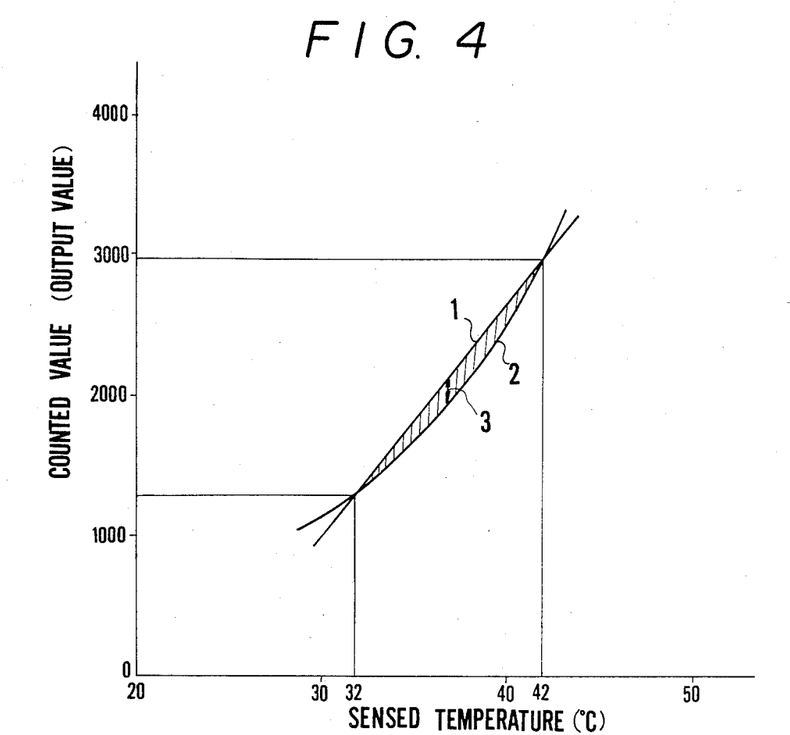
FIG. 4 is a graphical representation showing linear output values and non-linear output values when using a thermistor, wherein counted values are plotted along the vertical axis and temperature is plotted along the horizontal axis.

FIG. 4 is a graph showing linear and non-linear output values between the temperatures of 32° C. and 42° C. when using circuitry of the type shown in FIG. 3. Plotted along the vertical axis are counted values for a B constant of 4000 K. The counted values are similar to the output of the astable multivibrator 101 shown in FIG. 3. (As will be understood later with reference to FIG. 5, however, an output designated at 208 consists of 12 bits in order to produce an output signal indicative of the counted value.) The ROM 109 is used to correct the non-linearity of the thermistor 100 and astable multivibrator 101. In the illustrated example of FIG. 4, the portion requiring correction of non-linearity is indicated by the hatching. Thus, by storing only the hatched portion as correction data in ROM 109, a reduction in the required ROM capacity can be achieved.

With 4000 K as the B constant, the results of calculations performed at 0.1° C. intervals between 32° C. and 42° C. are as shown in the following Table, from which it will be appreciated that the maximum number of correction factors (counted values) will be about 74. Hence, a ROM capable of storing a seven-bit ($2^7 = 128$) data output will suffice.

Regarding the address input to the ROM, namely the uncorrected data 108 in FIG. 3, calculations are performed to find what the counted value is corresponding to 0.01° C. Since the difference in counted value over the temperature range of 10° C. between 32° C. and 42° C. is 1700 (2968 − 1276 = 1700), the counted value per 0.01° C. is 1700/(10° C./0.01° C.) = 1.7. In other words, to obtain an accuracy of 0.01° C., the number of correction factor steps should be decided in such a manner that the difference between correction factors is 1.7 counts or less. The following table, mentioned hereinabove, shows the counted values, as well as the correction factors corresponding thereto, based on calculations performed at 0.1° C. intervals between temperatures of 32° C. and 42° C., with a B constant of 4000 K.

TABLE

| Temperature (°C.) | Counted Value | Correction Factor |
| --- | --- | --- |
| 32.0 | 1276.1 | 0.0 |
| 32.1 | 1290.2 | 2.8 |
| 32.2 | 1304.4 | 5.5 |
| 32.3 | 1318.6 | 8.2 |
| 32.4 | 1332.9 | 10.9 |
| 32.5 | 1347.2 | 13.5 |
| 32.6 | 1361.6 | 16.0 |
| 32.7 | 1376.0 | 18.5 |
| 32.8 | 1390.5 | 21.0 |
| 32.9 | 1405.0 | 23.3 |
| 33.0 | 1419.6 | 25.7 |
| 33.1 | 1434.2 | 28.0 |
| 33.2 | 1448.9 | 30.2 |
| 33.3 | 1463.7 | 32.4 |
| 33.4 | 1478.5 | 34.5 |
| 33.5 | 1493.3 | 36.5 |
| 33.6 | 1508.2 | 38.6 |
| 33.7 | 1523.2 | 40.5 |
| 33.8 | 1538.2 | 42.4 |
| 33.9 | 1553.3 | 44.3 |
| 34.0 | 1568.4 | 46.1 |
| 34.1 | 1583.6 | 47.8 |
| 34.2 | 1598.8 | 49.5 |
| 34.3 | 1614.1 | 51.1 |
| 34.4 | 1629.4 | 52.7 |
| 34.5 | 1644.8 | 54.2 |
| 34.6 | 1660.3 | 55.7 |
| 34.7 | 1675.8 | 57.1 |
| 34.8 | 1691.3 | 58.5 |
| 34.9 | 1706.9 | 59.8 |
| 35.0 | 1722.6 | 61.0 |
| 35.1 | 1738.3 | 62.2 |
| 35.2 | 1754.1 | 63.4 |
| 35.3 | 1770.0 | 64.5 |
| 35.4 | 1785.9 | 65.5 |
| 35.5 | 1801.8 | 66.4 |
| 35.6 | 1817.8 | 67.3 |
| 35.7 | 1833.9 | 68.2 |
| 35.8 | 1850.0 | 69.0 |
| 35.9 | 1866.2 | 69.7 |
| 36.0 | 1822.4 | 70.4 |
| 36.1 | 1898.7 | 71.0 |
| 36.2 | 1915.1 | 71.6 |
| 36.3 | 1931.5 | 72.1 |
| 36.4 | 1947.9 | 72.6 |
| 36.5 | 1964.5 | 73.0 |
| 36.6 | 1981.1 | 73.3 |
| 36.7 | 1997.7 | 73.6 |
| 36.8 | 2014.4 | 73.8 |
| 36.9 | 2031.2 | 73.9 |
| 37.0 | 2048.0 | 74.0 |
| 37.1 | 2064.9 | 74.1 |
| 37.2 | 2081.8 | 74.1 |
| 37.3 | 2098.8 | 74.0 |
| 37.4 | 2115.9 | 73.8 |
| 37.5 | 2133.0 | 73.7 |
| 37.6 | 2150.2 | 73.4 |
| 37.7 | 2167.4 | 73.1 |
| 37.8 | 2184.7 | 72.7 |
| 37.9 | 2202.0 | 72.3 |
| 38.0 | 2219.5 | 71.8 |
| 38.1 | 2236.9 | 71.2 |
| 38.2 | 2254.5 | 70.6 |
| 38.3 | 2272.1 | 69.9 |
| 38.4 | 2289.8 | 69.1 |
| 38.5 | 2307.5 | 68.3 |
| 38.6 | 2325.3 | 67.5 |
| 38.7 | 2343.1 | 66.5 |
| 38.8 | 2361.0 | 65.6 |

TABLE-continued

| Temperature (°C.) | Counted Value | Correction Factor |
| --- | --- | --- |
| 38.9 | 2379.0 | 64.5 |
| 39.0 | 2397.0 | 63.4 |
| 39.1 | 2415.1 | 62.2 |
| 39.2 | 2433.3 | 61.0 |
| 39.3 | 2451.5 | 59.7 |
| 39.4 | 2469.8 | 58.3 |
| 39.5 | 2488.2 | 56.9 |
| 39.6 | 2506.6 | 55.4 |
| 39.7 | 2525.0 | 53.8 |
| 39.8 | 2543.6 | 52.2 |
| 39.9 | 2562.2 | 50.5 |
| 40.0 | 2580.9 | 48.8 |
| 40.1 | 2599.6 | 46.9 |
| 40.2 | 2618.4 | 45.1 |
| 40.3 | 2637.3 | 43.1 |
| 40.4 | 2656.2 | 41.1 |
| 40.5 | 2675.2 | 39.0 |
| 40.6 | 2694.2 | 36.9 |
| 40.7 | 2713.4 | 34.7 |
| 40.8 | 2732.5 | 32.4 |
| 40.9 | 2751.8 | 30.1 |
| 41.0 | 2771.1 | 27.7 |
| 41.1 | 2790.5 | 25.2 |
| 41.2 | 2810.0 | 22.7 |
| 41.3 | 2829.5 | 20.1 |
| 41.4 | 2849.1 | 17.4 |
| 41.5 | 2868.7 | 14.7 |
| 41.6 | 2888.4 | 11.9 |
| 41.7 | 2908.2 | 9.0 |
| 41.8 | 2928.1 | 6.1 |
| 41.9 | 2948.0 | 3.1 |
| 42.0 | 2968.0 | 0.0 |

In the foregoing table, the range of temperatures for which the difference from one correction factor to the next is 1.7 or less is 34.1° C. to 40.0° C. This range of temperatures is well within the range of 35° C. to 38° C. required for clinical thermometers. It will be seen from the table that the difference in the correction factor between 41.9° C. and 42.0° C. is 3.1 counts. This is equivalent to an error or 0.018° C. and represents the poorest value. Generally speaking, therefore, a resolution of not less than 0.02° C. can be obtained in the illustrated example even in a range of temperature measurements outside the range of 35° C. to 38° C.

It may be understood from the foregoing, then, that applying a correction at intervals of 0.1° C. is sufficient for obtaining an accuracy of within 0.01° C. for temperatures ranging from 35° C. to 38° C. Let us now calculate the number of bits necessary for addressing the ROM under these conditions.

A step or increment of 0.1° C. from one temperature to the next is equivalent to a counted value of 17, since a counted value of 1.7 corresponds to 0.01° C. of temperature, as mentioned above. Accordingly, it will suffice to change the ROM address for each count of the 17 counts. More specifically, of the 12-bit output produced by the astable multivibrator 101, the ROM should be addressed by the eight higher order bits obtained by deleting the four lower order bits. Thus, since $2^4 = 16$, which is less than the required counted value of 17, the eight higher order bits which remain after deleting the four lower order bits are used to address the ROM. With a corrective ROM in which one word is constituted by seven-bit data, therefore, a storage capacity for the 256 words capable of being designated by an eight-bit address is fully satisfactory.

While the foregoing has been described based on calculated values, linear output values obtained from a diagram for the temperature range of 32° C. to 42° C. are substantially close to the calculated values.

Figure 5:
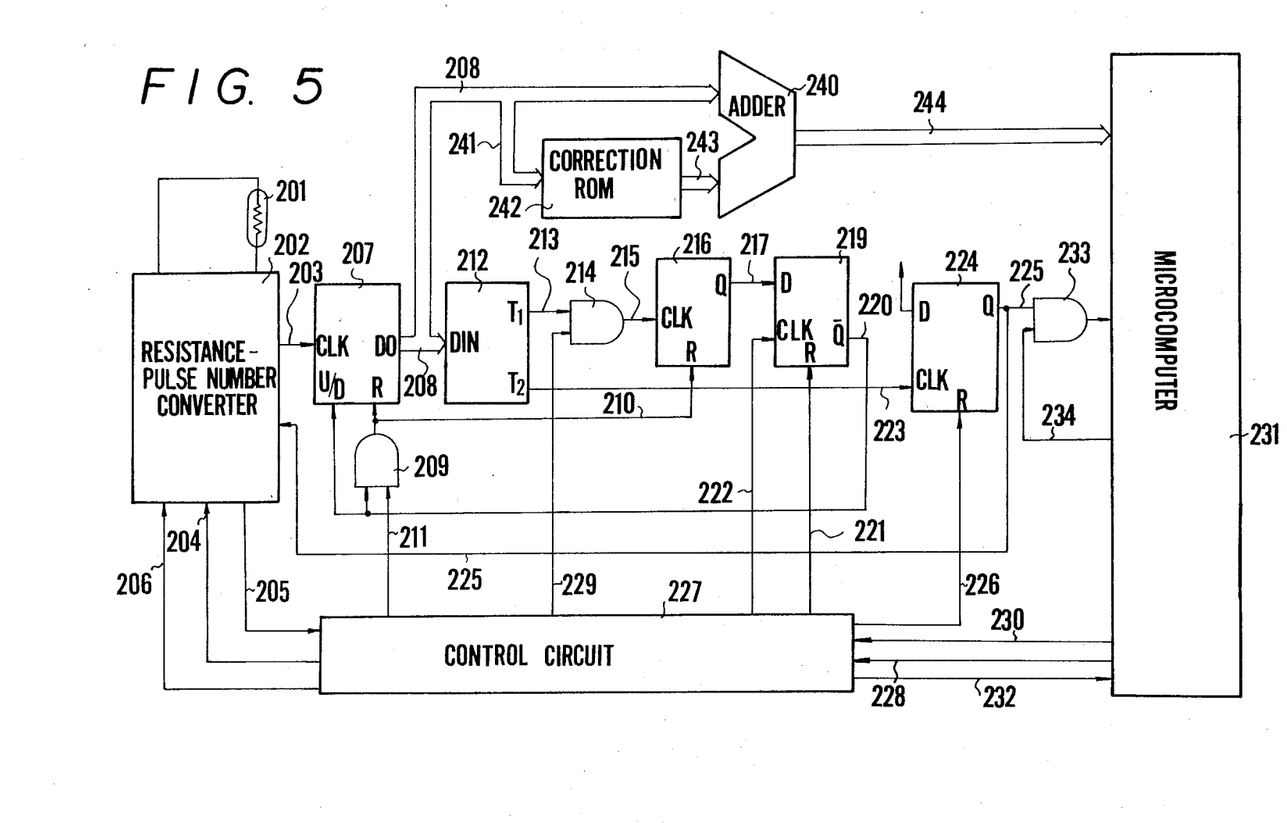
FIG. 5 is a block diagram showing a circuit arrangement for a case where the invention is applied to an electronic clinical thermometer in concrete form.
Figure 6:
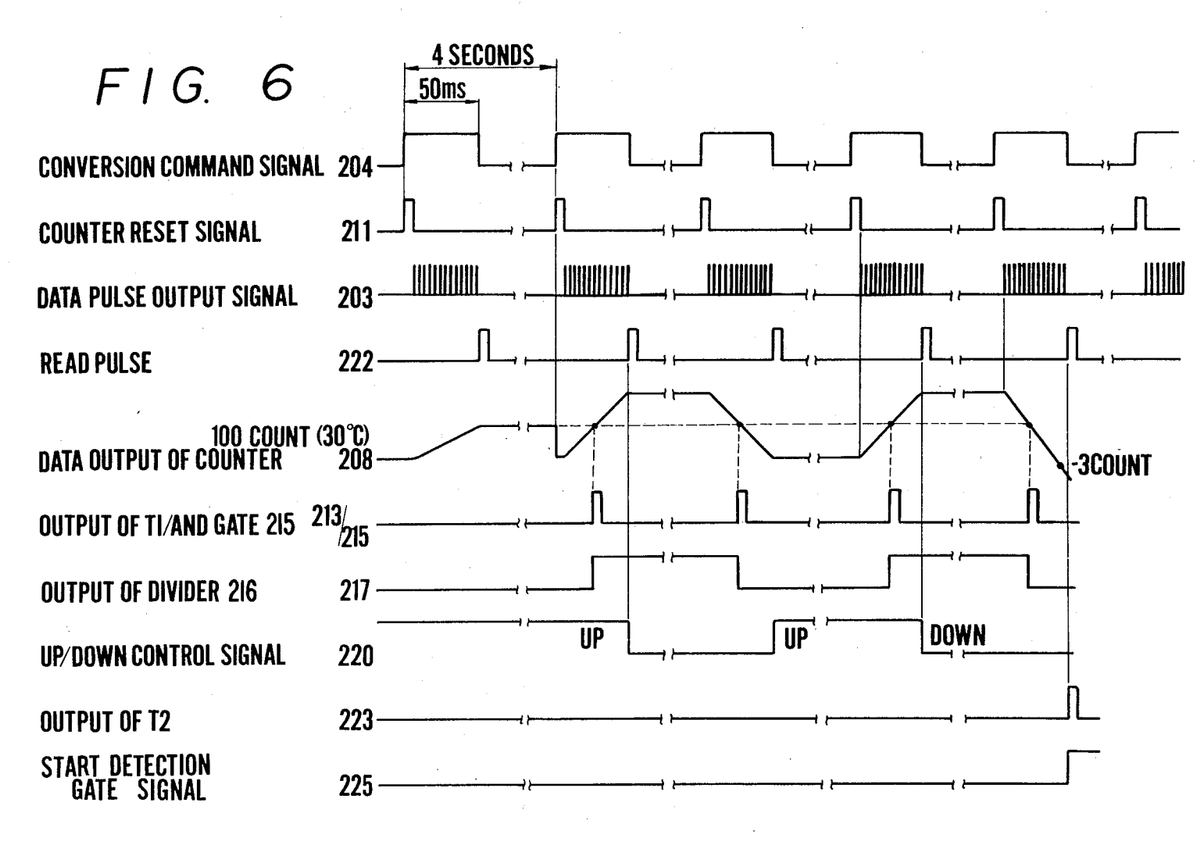
FIG. 6 is a timing chart useful in describing the operation of the circuit arrangement shown in FIG. 5.

Reference will now be had to FIGS. 5 and 6 to describe, in greater detail, the overall construction and operation of an electronic clinical thermometer incorporating the corrective ROM 109 for linearizing the non-linear output values, and the arithmetic unit 111 for executing the correction operation.

In FIG. 5, a converting circuit 202 for converting the resistance value of a thermistor 201 into a pulse number receives a reference clock signal 206 and a conversion command signal 204 from a control circuit 227. When the command signal 204 from the control circuit 227 goes to logical "1", thereby constituting a start signal, the converting circuit 202 begins the conversion operation. Signal 204 is sent to logical "0" by a conversion end signal 205 which the converting circuit 202 delivers to the control circuit 227, ending the conversion operation.

The converting circuit 202 produces a data pulse output signal 203 which serves as a clock input CLK to a counter 207. The counter 207 is of the reversible counting-type and has an up/down (U/D) terminal for deciding the counting direction. When logical "1" appears at terminal U/D, the counter 207 counts up its clock input. Logical "0" at terminal U/D causes the clock input to be counted down. Reference character R denotes the reset terminal of counter 207. The data output 208 of counter 207 is applied to a decoder 212 as a data input. The decoder 212 is adapted to produce a logical "1" output on its output terminal T1 upon receiving from counter 207 a data input equivalent to 100 pulses, this occurring when the thermistor 201 senses a temperature of 30° C. A signal appears on output terminal T2 of the decoder 212 when logical "0" is applied to the U/D terminal of counter 207 and the counter counts down to −3, applying this data to the decoder 212. The output signal obtained from terminal T1 is designated at 213. This signal is applied to an AND gate 214 whose other input is a decode control signal 229 from the control circuit 227. When the thermistor 201 senses a temperature of 30° C. or more, causing an output to appear on terminal T1 of the decoder 212, and when the decode control signal 229 is logical "1", an output signal 217 of a divide-by-2 frequency divider 216 goes to logical "1". This signal is applied to the data input of a data-type flip-flop 219. The clock input to the flip-flop 219 is a read pulse 222 produced by the control circuit 227 in sync with the trailing edge of the conversion command signal 204 in order that the data input may be stored in the flip-flop 219. With the data input to flip-flop 219 being logical "1", its $\overline{Q}$ output, namely an up-/down control signal 220, goes to logical "0". The counter 207, which receives the $\overline{Q}$ output at its U/D terminal, is switched over from the up-count to the down-count mode and begins counting down the pulses 203. In addition, a counter reset signal 211 is gated by an AND gate 209 and not allowed to pass. Accordingly, the data pulse input 203 to the counter 207 resulting from the next conversion command signal 204 will count down the counter from the value of the previous up-count operation.

The final value resulting from the down-count operation will be zero when the previously measured temperature and the temperature just measured are the same. When the latter is higher, however, counter 207 is counted down beyond zero to a negative value. When this value reaches a count of, say, −3 (corresponding to a temperature of +0.3° C.) or a more negative value, an output pulse 223 emerges from terminal T2 of decoder 212 and enters a flip-flop 224 which responds by producing a signal 225 indicating that a meaningful measurement may begin. This signal is applied to the converting circuit 202, placing it in a body temperature measurement mode and elevating its precision. The signal 225 is also applied to the restart terminal of the microcomputer 231 through an AND gate 233. The AND gate 233 takes the AND between this signal and a signal 234 generated every second, whereby the microcomputer 231 is started every second from its interrupt-start address.

A measurement start signal 230 from the microcomputer 231 functions as a sampling command. When the signal enters the control unit 227, the latter produces the conversion command signal 204 whereby a data output 208 corresponding to the temperature measured by the thermistor 201 is obtained. The data output 208 is applied to an adder 240. Uncorrected data 241, comprising the eight higher order bits of the binary data output 208, addresses a correction ROM 242, providing a read-out of corrective data 244 designated by the eight-bit address. The corrective data is applied to the other input terminal of the adder 240, which proceeds to add this data to the data output 208. The computed sum, namely a corrected data output designated at 244, is delivered to the microcomputer 231. Upon receiving the signal indicative of the corrected data, the microcomputer executes the prescribed processing and causes the correct temperature to be displayed. At the end of the body temperature measurement, the microcomputer 231 sends a measurement end signal 228 to the control circuit 227 to again establish a pre-measurement mode for sensing the start of a measurement. The microcomputer 231 enters a stand-by mode at this time to reduce power consumption.

Returning to the state of counter 207, a count of less than −3 (i.e., −2, −1, 0, +1 ...) in the countdown mode of operation will not allow the decoder 212 to produce the pulse 223. Flip-flop 224 therefore will not change state, and signal 225 will not appear. Since the divide-by-two frequency divider 216 is receiving the decoded output 215 at the start of the down-count operation, the output of the frequency divider again changes state at this time and, in consequence, so does flip-flop 219. The resulting high level of signal 220 places the counter 207 in the up-count mode and, with the arrival of signal 211, in the reset state. This re-establishes the conditions for detection of a temperature of 30° C. or more.

The circuit shown in FIG. 5 is constructed using C-MOS technology. At the instant power is introduced, the counter-set signal 211 and flip-flop reset signals 221, 226 are produced to reset the counter and flip-flops. The microcomputer 231, on the other hand, receives a reset signal 232 for initialization, upon which the microcomputer is placed in the stand-by mode to suppress power consumption.

For a fuller understanding of the actions and effects of the invention, the operation of the embodiment shown in FIG. 5 will be described in greater detail with reference to the timing chart of FIG. 6.

The conversion command signal 204, namely a pulse having a duration (e.g. 50 milliseconds) equivalent to the conversion time, is delivered to the converting circuit 202 by the control circuit 227 every four seconds. The converting circuit 202 produces the data pulse output signal 203 upon receiving the conversion command. The read pulse 222 is produced at the end of each 50-millisecond pulse in the conversion command signal 204. Assume now that counter 207 has begun counting the pulses 203 as they are produced by the converting circuit in response to the command signal 204. If the count does not exceed 100 (signifying that the temperature has not reached the threshold of 30° C.), then the decoded output 213 does not appear. As a result, the circuitry from the divide-by-two frequency divider 216 onward is inactive. When the second pulse in the command signal 204 arrives, the counter 207 again begins counting and, in this case, counts up to a number greater than 100, at which point logical "1" appears on output terminal T1 of decoder 212, sending the output signal 217 of frequency divider 216 to logical "1" as well. The read pulse 222 is produced in response to the conversion end signal 205 from the converting circuit 202, and causes the data-type flip-flop 219 to store the frequency divider output 217, the $\overline{Q}$ output of the flip-flop, namely signal 220, going to logical "0". Counter 207 therefore is switched over from the up-count to the down-count mode and is counted down by the next series of data pulses 203 produced by the converting circuit 202 in response to the next conversion command signal 204. In the course of being counted down, the value of the count passes the 100 mark, at which point logical "1" again appears at the output terminal T1 of the decoder 212. This "1" logic is stored in the flip-flop 219 by the read pulse 222 and sends the up/down control signal 220 to logical "1". When the counter reset signal 211 (logical "1") appears, AND gate 209 delivers a pulse since signal 220 is now high, thereby applying a reset pulse to the reset terminals R of counter 207 and the divide-by-two frequency divider 216. Counter 207, however, has not registered any temperature change. Thus, when the difference between the previous and latest temperature measurements is zero, the reset signal does not change the state of counter 207 since its content will already be zero because the up-count and down-count operations will have cancelled each other. It should be noted, however, that counter 207 will be cleared to zero if it has counted to a negative number of less than $-3$ (namely $-2$ or $-1$). Frequency divider 216 is in the reset mode.

Counter 7 now begins counting up the pulses 203 produced in response to the next conversion command signal 204. It will be assumed that the count surpasses 100. The "1" logic on output terminal T1 of decoder 212 is stored in flip-flop 219 by the read pulse 222, whereby the up/down control signal 220 is set to logical "0". When the next conversion command signal 204 arrives, counter 207 is counted down by the data pulses 203 and, when the 100 mark is passed, terminal T1 of the decoder goes to logical "1". The "1" logic sends the frequency divider output 217 to logical "1". In this case, however, we shall assume that a significant temperature change has been measured by the thermistor so that the counter 207, which is executing the down-count operation, counts down to $-3$ before the next read pulse 222 is produced. Now, owing to the set conditions, decoder 212 produces a logical "1" signal, namely signal 223, at its output terminal T2. This signal is applied to the clock input terminal CLK of data-type flip-flop 224 and causes the flip-flop 224 to store its data input, sending its Q output to logical "1". This output signal, namely the measurement start detection signal 225, is applied to the microcomputer 231 and constitutes a restart signal, thereby starting the microcomputer from a predetermined address to read in the corrected data output 244.

The corrected data output 244 is indicative of the value computed by the adder 240, namely the sum of the data output 208 from counter 207 and the corrective data 243 read out of the correction ROM 242.

Figure 7:
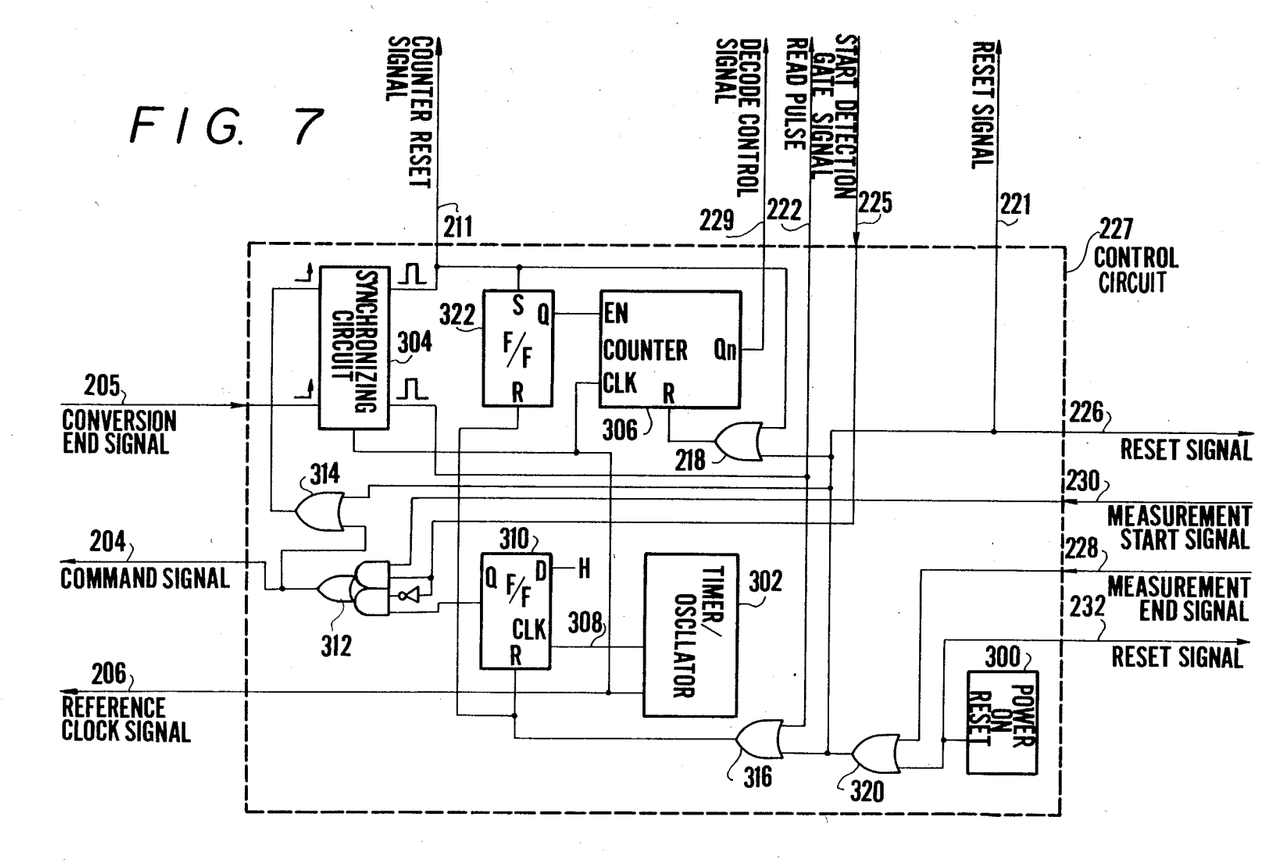
FIG. 7 is a block diagram illustrating the details of a control unit included in the arrangement of FIG. 5.

The construction of the control circuit 227 is shown in FIG. 7. A power-on reset circuit 300 produces the reset signal 232 when power is introduced to the electronic clinical thermometer of this embodiment from a power supply. Signal 232, as well as being sent to the microcomputer, functions to reset the logic within the control circuit 227. A timer/oscillator circuit 302 delivers the reference clock 206 to the converting circuit 202, the clock 206 also being used as a control clock for the logic within the control circuit 227. By way of example, the clock 206 is used by a synchronizing circuit 304, comprising a plurality of flip-flops, to produce the pulses 211 synchronized to the clock 206 at the leading edge of its input signal, and is used as a timer counting clock by a counter circuit 306 for producing the decoder control signal 229. The oscillator circuit 302 also produces a clock 308. This serves as a pre-measurement timing clock, set to a period of four seconds, for use in the abovementioned pre-measurement operation of low accuracy. The periods of clocks 206, 308 can be set freely by the microcomputer 231. A pre-measurement flip-flop 310 is triggered by the leading edge of the clock 308 and produces the measurement start command 204 via an OR gate 312. The other input to OR gate 312 is the measurement start detection signal 225 which, similarly, sends the signal 204 to logical "1". An OR gate 314 is provided in order that the reset signal 211 for the counters 207, 306 may be formed in sync with the command signal 204 or the reset signal 226. The conversion end signal 205 activates the synchronizing circuit 304 which responds by producing the read pulse 222 and, through an OR gate 316, by resetting corresponding flip-flops 310, 322. Reset signals 221 and 226 are produced by an OR gate 320 in response to the power-on reset signal 232 or the measurement end signal 228 from the microcomputer 231.

Figures 8A, 8B:
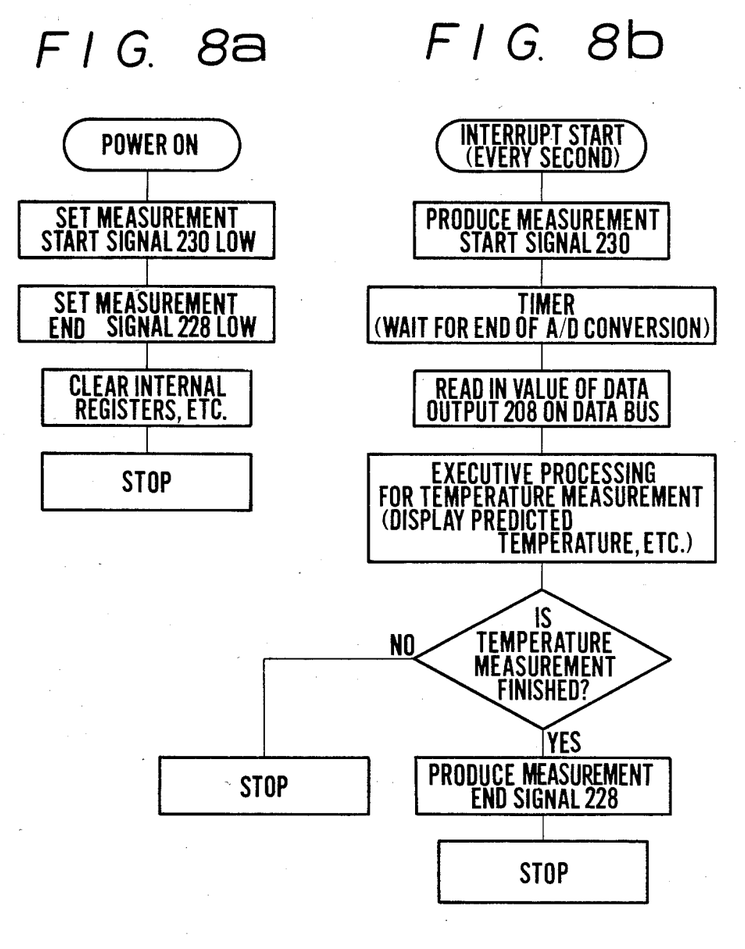
FIGS. 8a and 8b are flowcharts useful in describing the processing executed by a microcomputer for measuring temperature.

Reference will now be had to FIGS. 8a and 8b to describe the control executed by the the microcomputer 231.

Referring first to FIG. 8a, the measurement start signal 230 is set to a low level when power is introduced. Next, the measurement end signal 228 is set to the low level and the registers are cleared, establishing a halted state awaiting an interrupt.

In FIG. 8b, the microcomputer 231 has been started by the interrupt start signal 234 generated every second and produces the measurement start signal 230. Thenceforth the timer is set and the microcomputer awaits for the end of an A/D conversion, i.e, for the conversion of temperature information into digital data. When the time kept by the timer expires, the corrected data output 244 on the data bus is read in, computations and processing are executed on the basis of the data through use of well-known means, the predicted temperature is displayed, and so forth. When the body temperature measurement ends, the measurement end signal 228 is produced and the CPU is halted. The CPU enters the halted state both after the execution of prescribed computations and in cases where the temperature measurement has not ended.

The present invention, having the construction and operating as described hereinabove, has a number of actions and effects which will now be set forth.

First, it is possible to achieve the required precision in the measured values with a storage unit which need store only a small quantity of corrective data. The invention therefore enables a reduction in the memory capacity used.

Further, according to the invention, processing as performed by the microprocessor is not required to obtain the corrected values, as these are provided at the output of the adder. Highly precise measurements can therefore be obtained in a short period of time, enabling a reduction in the electric power required for operation.

With the present invention as embodied hereinabove, a specific temperature is set up as a threshold, and the start of an actual body temperature measurement is controlled based upon the detection of a temperature gradient, measured starting from said specific temperature, over a predetermined period of time. The electronic clinical thermometer of the invention therefore exhibits a high degree of reliability.

Since the corrective data is read out of the small-capacity memory (ROM) at the beginning of measurement in response to detection of a measurement start signal, the electronic clinical thermometer, besides having the required accuracy, also consumes little electric power since power is, for the most part, not consumed until after measurement begins. Furthermore, in accordance with the illustrated embodiment, temperature data in a premeasurement for sensing the start of measurement, as well as temperature data at the time of an actual measurement, can be obtained from a common temperature sensing unit. This enables a reduction in the number of component parts and contributes to a smaller thermometer.

Various embodiments are possible within the scope of the invention. For example, the corrective data storage unit, reduced in capacity according to the technique of the invention, can be provided within the memory of the microcomputer which executes the temperature measurement processing. The microcomputer can then be adapted to add the temperature data as sensed by the thermistor and the corrective data designated by the address constituted by the higher order bits of said temperature data.

As many apparently widely different embodiments of the present invention can be made without departing from the spirit and scope thereof, it is to be understood that the invention is not limited to the specific embodiments thereof except as defined in the appended claims.

What I claim is:

1. An electronic clinical thermometer which comprises:

temperature sensing means for producing an output signal which signal corresponds to a temperature sensed by said temperature sensing means;

corrective data storage means coupled to said temperature sensing means for storing plural items of corrective data which data serves to correct said output signal to enable a temperature measurement of desired accuracy by said temperature sensing means, said storage means being arranged to be addressed by an input signal which is the output signal of said temperature sensing means, said temperature sensing means being operative to produce said output signal as a digital signal having a resolution higher than a predetermined temperature resolution, wherein higher order bits of said digital signal, which bits represent a resolution corresponding to the predetermined temperature resolution, serve as the address input to said corrective data storage means for reading corrective data out of said storage means, the corrective data corresponding to the address input being read out of said storage means; and adding means coupled to said temperature sensing means and to said corrective data storage means for adding the corrective data read out of said corrective data storage means and the output signal of said temperature sensing means, said output signal being made to approximate a linear output in a predetermined temperature range at an output of said adding means to enable said temperature measurement of desired accuracy.

2. The electronic clinical thermometer according to claim 1, in which said temperature sensing means comprises:

a thermistor which senses temperature;

an RC oscillator circuit connected to said thermistor which oscillator circuit produces an output signal the oscillation frequency of which is a function of the thermistor resistance; and a counter which converts the oscillation frequency of the output signal produced by said oscillator circuit into a digital value indicative of a number of pulses per unit time.

3. The electronic clinical thermometer according to claim 2, including control means coupled to said RC oscillator circuit and to said counter for providing a command signal to activate said oscillator circuit and for passing the output of said counter over said predetermined temperature range.

4. The electronic clinical thermometer according to claim 3, wherein said control means includes a decoder means for detecting when the output of said counter corresponds to a sensed temperature of about 30° C.

5. The electronic clinical thermometer according to claim 1, including control means coupled to said temperature sensing means, said corrective data storage means and said adding means for providing a command signal to activate said temperature sensing means and for passing the output of said temperature sensing means over said predetermined temperature range.

6. The electronic clinical thermometer according to claim 5, wherein said control means includes a decoder means for detecting when the output signal from said temperature sensing means corresponds to a sensed temperature of about 30° C.

7. An electronic clinical thermometer which comprises:

temperature sensing means for producing an output signal which signal corresponds to a temperature sensed by said temperature sensing means;

corrective data storage means coupled to said temperature sensing means for storing plural items of corrective data which data serves to correct said output signal to enable a temperature measurement of desired accuracy by said temperature sensing means, said storage means being arranged to be addressed by an input signal which is the output signal of said temperature sensing means, said temperature sensing means being operative to produce said output signal as a digital signal having a resolution higher than a predetermined temperature resolution, wherein higher order bits of said digital signal, which bits represent a resolution corresponding to the predetermined temperature resolution, serve as the address input to said corrective data storage means for reading corrective data out of said storage means, to corrective data corresponding to the address input being read out of said storage means; and linearity correction means coupled to said temperature sensing means and to said corrective data storage means for combining said output of said temperature sensing means and said corrective data readout of said corrective data storage means to produce a combined output signal, said combined output signal being made to approximate a linear output in a predetermined temperature range at an output of said linearity correction means to enable said temperature measurement of desired accuracy.

8. The electronic clinical thermometer according to claim 7, in which said temperature sensing means comprises:

a thermistor which senses temperature;

an RC oscillator circuit connected to said thermistor which oscillator circuit produces an output signal, the oscillation frequency of which is a function of the thermistor resistance; and a counter which converts the oscillation frequency of the output signal produced by said oscillator circuit into a digital value indicative of a number of pulses per unit time.

9. The electronic clinical thermometer according to claim 8, including control means coupled to said RC oscillator circuit and to said counter for providing a command signal to activate said oscillator circuit and for passing the output of said counter over said predetermined temperature range.

10. The electronic clinical thermometer according to claim 9, wherein said control means includes a decoder means for detecting when the output of said counter corresponds to a sensed temperature of about 30° C.

11. The electronic clinical thermometer according to claim 7, including control means coupled to said temperature sensing means, said corrective data storage means and said adding means for providing a command signal to activate said temperature sensing means and for passing the output of said temperature sensing means over said predetermined temperature range.

12. The electronic clinical thermometer according to claim 11, wherein said control means includes a decoder means for detecting when the output signal from said temperature sensing means corresponds to a sensed temperature of about 30° C.

* * * * *